United States Patent [19]
Kearfott et al.

[11] Patent Number: 5,746,340
[45] Date of Patent: May 5, 1998

[54] VENTED LID FOR ELECTRIC ENCLOSURES

[75] Inventors: Robert T. Kearfott, Bristol, Va.; Garry F. Raines, Bristol, Tenn.

[73] Assignee: Line Power Manufacturing Corporation, Bristol, Va.

[21] Appl. No.: 597,638

[22] Filed: Feb. 5, 1996

[51] Int. Cl.$^6$ .................................................. H02G 3/08
[52] U.S. Cl. ............................ 220/3.8; 220/327; 220/374
[58] Field of Search ................................. 220/373, 374, 220/3.8, 327, 328, 216, 219, 227, DIG. 25

[56] References Cited

U.S. PATENT DOCUMENTS

| | | | |
|---|---|---|---|
| 112,674 | 3/1871 | Arnold | 220/374 |
| 947,642 | 1/1910 | Leave | 220/374 X |
| 1,367,164 | 2/1921 | Miller | 220/374 X |
| 1,695,358 | 12/1928 | Appleman | 220/374 X |
| 4,693,393 | 9/1987 | DeMinco et al. | 220/374 |
| 5,172,944 | 12/1992 | Munich et al. | |
| 5,292,189 | 3/1994 | Lau et al. | |
| 5,380,083 | 1/1995 | Jones et al. | |
| 5,407,263 | 4/1995 | Jones et al. | |
| 5,435,454 | 7/1995 | Ishii | 220/374 |
| 5,465,528 | 11/1995 | Schinzel et al. | |
| 5,558,244 | 9/1996 | Akaike et al. | 220/374 |

FOREIGN PATENT DOCUMENTS

289414  10/1931  Italy ................................. 220/374

*Primary Examiner*—Stephen Cronin
*Attorney, Agent, or Firm*—Veal & Associates

[57] ABSTRACT

An electrical enclosure lid composed of several elongated members nested in such a way that a tortuous air channel is created between each member. The air channel allows heat generated by internal electrical components, such as large power transformers, to pass out of the lid to facilitate convection cooling of the enclosure. Due to the labyrinthine air channel, flames potentially generated inside the enclosure are hindered from passing outside the enclosure. Drainage holes are included on the sides of the lid to allow water to pass over the lid without entering the enclosure. The design is optimized for harsh environments such as a mining operation where large amounts of power are needed in close proximity to workers. The nesting structure provides strong structural support to protect the enclosure in case of a rock fall or a cave-in.

27 Claims, 7 Drawing Sheets

VENTED LID FOR ELECTRIC ENCLOSURES

FIELD OF THE INVENTION

The present invention relates generally to electrical equipment enclosures. In particular, the present invention relates to vented top covers or lids for electrical equipment enclosures. In greater particularity, the present invention relates to lids for electrical power equipment enclosures that provide venting of hot air while maintaining environmental protection for the internal components of the enclosure and to lids that also have internal flame retarding characteristics.

BACKGROUND OF THE INVENTION

An underground mining operation such as a coal mine presents hazardous conditions for both machines and workers. An underground coal mine resembles a large construction project and frequently groups of workers are around or near high power electrical equipment. Mining equipment quite often requires large amounts of electrical power located near the underground excavation point which creates a need for large power transformers near the excavation point. These electrical power transformers combined with input, output, and control circuitry are combined in one enclosure called a power center. A power center is typically protected by a solid sheet-metal enclosure, and in some instances the enclosures include vents in the side covers to help cool the large internal transformer. The enclosure's main purpose is to protect the transformer from dust, dripping water, and condensation, and dissipate heat. In addition, the enclosure must protect the power center from damage due to rock slides, rock falls, and cave-ins. The top cover or lid of the enclosure is a critical component to protect the power center because the lid has the most direct exposure to the adverse elements.

In addition to protecting the internal electrical components, enclosures are designed to increase mine safety. In the event of an internal electrical failure within the power center, the enclosure must retard the introduction of flames or sparks into the mining area where flammable materials may be ignited. Vents designed into the side covers of the enclosure must be able to allow the venting of heated air while resisting the release of flames or sparks. Because power center enclosures must be flare or flame-resistant, and because they must maintain the structural integrity of the power center during roof falls, the typical power center enclosure has not, in the past, included vents in the top covers.

Nevertheless, increased use of larger power equipment is forcing coal mining operations to install power centers with a higher kilovolt amperes (KVA) output. These higher output power centers have larger transformers to accommodate the higher power requirements, and these larger transformers also produce more heat. This additional heat creates many problems. One problem is that the enclosure and especially the metal lid of the enclosure becomes very hot. "Skin" temperatures of the top covering can reach 140 degrees C., thereby creating a hazard to workers who may come in contact with the heated surface. This necessitates the introduction of additional safety measures to protect workers from the hot power centers, and these new measures must comply with MSHA regulations or other applicable regulations.

The increased heat from the larger transformers also creates a technical problem. Internal electrical components are adversely affected by the heat and may be damaged or even fail. The excess heat also reduces the efficiency of the power conversion process and reduces the life expectancy of the transformer. Additionally, some transformers incorporate a thermocouple within the transformer coil that shuts down the transformer when too high a temperature is reached. If this type of transformer is utilized in the power center, excess heat may cause an unscheduled power shutdown and cause a significant loss of revenue to a mining operation.

A vented lid enclosure is a solution to the problem of excess heat within a power center. Lid venting increases the efficiency and longevity of a large transformer, reduces the external skin temperature, thereby protecting workers, and promotes higher power center reliability. However, a vented lid must still be able to provide adequate environmental protection for the internal electrical components of the power center. To date, the requirement to protect the power center from the harsh mining elements has prohibited the use of vented lids. Therefore, there is a great need for a structurally strong, flame-retardant, vented lid to be used in high output power centers. Any industry that uses power centers to power equipment in hazardous areas such as a coal mining operation will benefit from the incorporation of a vented lid enclosure that can adequately protect internal electrical components from the harsh environmental factors present.

SUMMARY OF THE INVENTION

It is the object of the present invention to provide a vented lid for electrical enclosures.

Another object is to provide a vented lid for electrical enclosures that includes nested elongated members creating an air channel between the members for ventilation.

Yet another object of the present invention is to provide a tortuous air channel that allows the flow of hot air out of an electrical enclosure while retarding the emission of flames from the enclosure in case of an internal fire.

The invention may be briefly described as a series of nested elongated members shaped to create a curved and tortuous air channel between the members. The air channel has a labyrinthine shape so that hot air generated by heat from internal electrical components can readily escape from inside the enclosure, but flames from inside the enclosure caused by an electrical malfunction are impeded from escaping. Also, the air channel is protected by the members and does not allow dust, water, or other debris to enter the enclosure. The nested structure of the members creates a lid structurally stronger than standard sheet metal so that internal electrical components are protected from rock falls and cave-ins.

Other features and objects and advantages of the present invention will become apparent from a reading of the following description as well as a study of the appended drawings.

BRIEF DESCRIPTION OF THE DRAWINGS

A lid incorporating the features of the invention is depicted in the attached drawings which form a portion of the disclosure and wherein.

DESCRIPTION OF THE PREFERRED EMBODIMENTS

Figure 1:
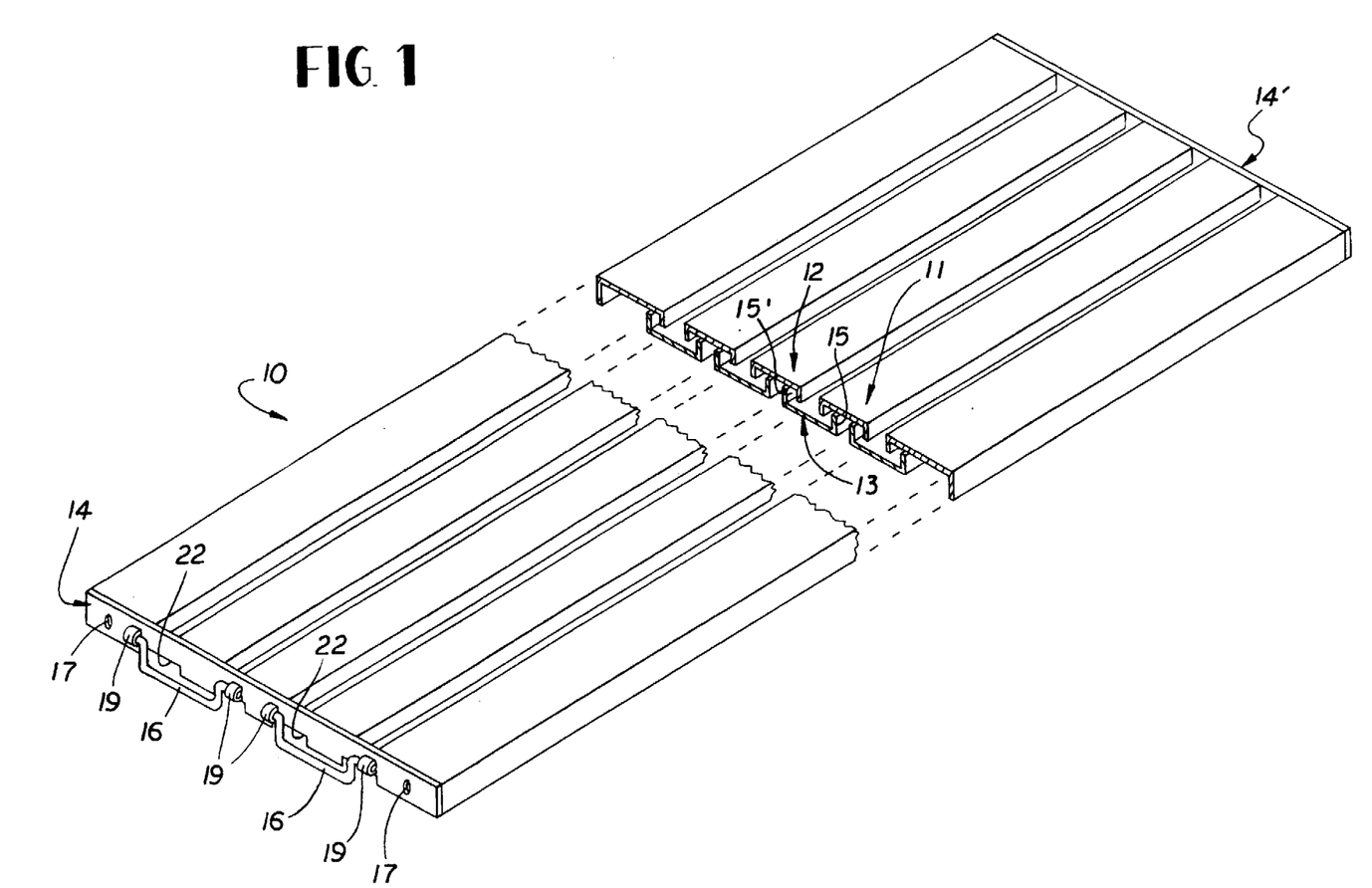
FIG. 1 a top perspective view of the vented lid showing the aligned nested members.
Figure 2:
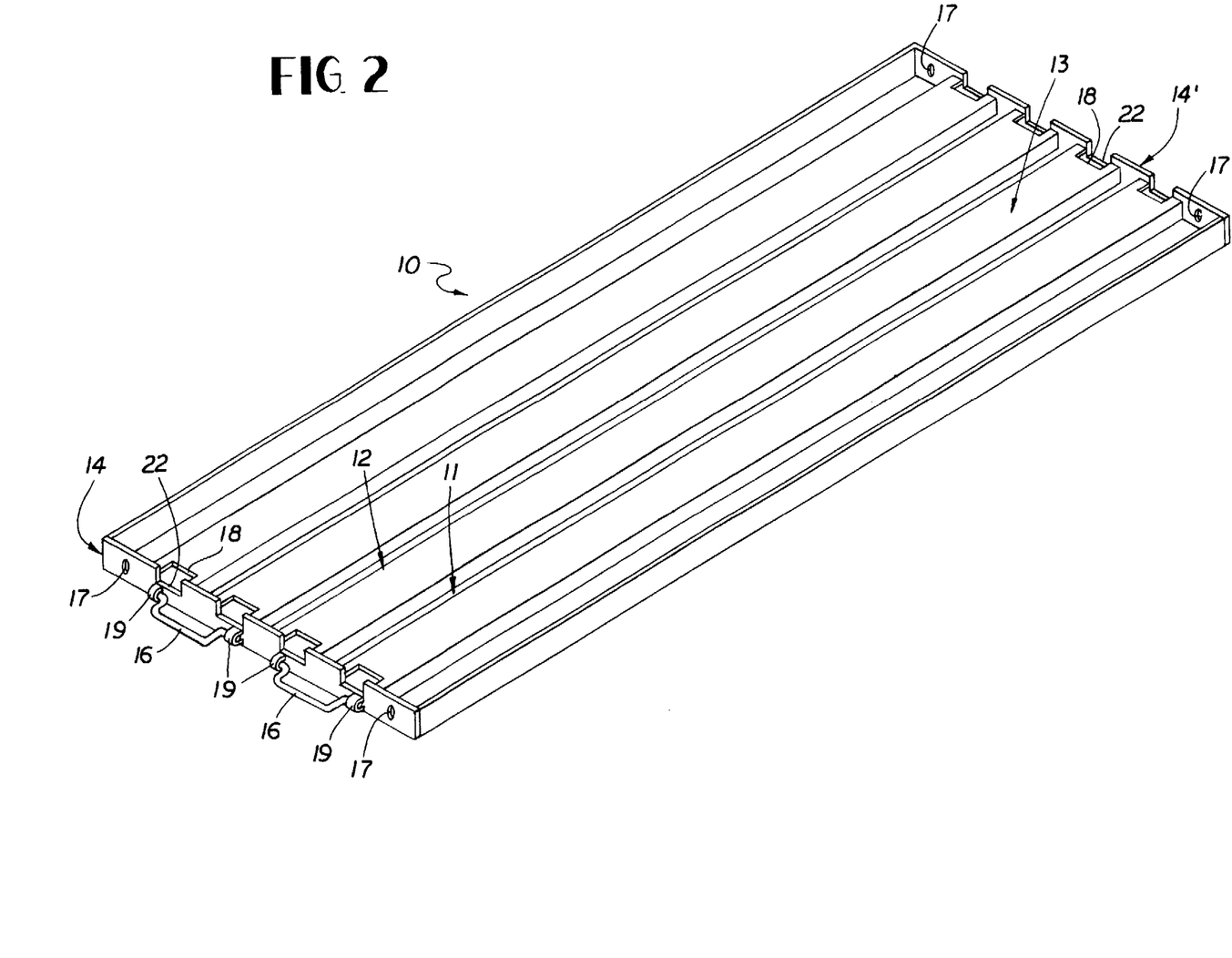
FIG. 2 is a bottom perspective view of the vented lid.
Figure 6:
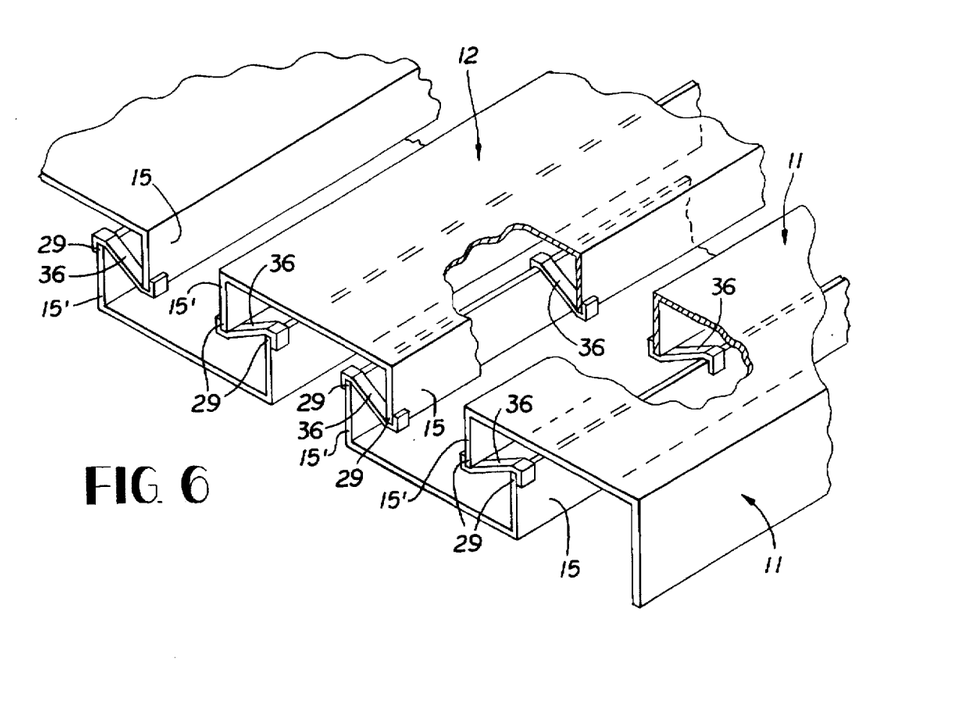
FIG. 6 is a perspective view of the lid sectioned to show spacing members in place of end members to connect the elongated members.

Referring to the drawings for a better understanding of the function and structure of the invention, the preferred embodiment is shown in FIG. 1 and FIG. 2 showing the lid from top and bottom perspectives. Representative elongated members 11 and 12 have a planar portion along a longitudinal axis and two lateral downwardly extending perpendicular portions, 15 and 15'. Elongated representative member 13 is shaped similarly to, but positioned in an opposing manner to members 11 and 12. These members are repeated in a parallel fashion to form the rectangular planar array that comprises lid 10. An end member 14 is welded in a conventional manner to connect the elongated members at one end, and the combined two end members 14, 14' maintain the elongated members in a spaced relationship. Alternatively, the elongated members may have small spacer members welded between and connecting each elongated member and an adjacent elongated member. FIG. 6 shows the vented lid with spacer members 36 connecting the edges 29 of each adjacent lateral portion in place of end members. The spacer members 36 are welded in a conventional manner along the length of the lateral portions 15, 15' to maintain a cooperatively spaced arrangement between the elongated members. Use of the spacer members 36 obviates the need for end members 14, 14'.

Referring again to FIGS. 1 and 2, handles 16 are attached to the end members 14, 14' via welded U-clips 19 for removing the lid from the electrical enclosure, and apertures 17 receive a bolt for attaching the lid to the electrical enclosure in a conventional manner. The alternating lateral or flange portions 15 and 15' affixed to the end members, yields an integrated C-beam or a waffle type construction which is much stronger than a mere planar lid. As seen more clearly in FIG. 2, the lower set of elongated members have rectangular notches 18 at both ends, and the end members 14, 14' have cooperatively formed rectangular notches 22 located adjacent to the end notches 18. These notches facilitate the drainage of water and debris that may contact the outer top surface of member 13. Essentially, the notch in the end member serves as a drainage opening. If water forms on member 13 through the gap between members 11 and 12 from condensation or from water dripping from a cave ceiling, the water will flow along the outer top surface of member 13 and exit from the lid through the notch 18 at the end of 13 and through the drainage opening 22 in the end member and onto the ground. The lid may be attached to the enclosure so that one end is slightly elevated to improve water drainage. (see FIG. 8a)

Figures 3, 4:
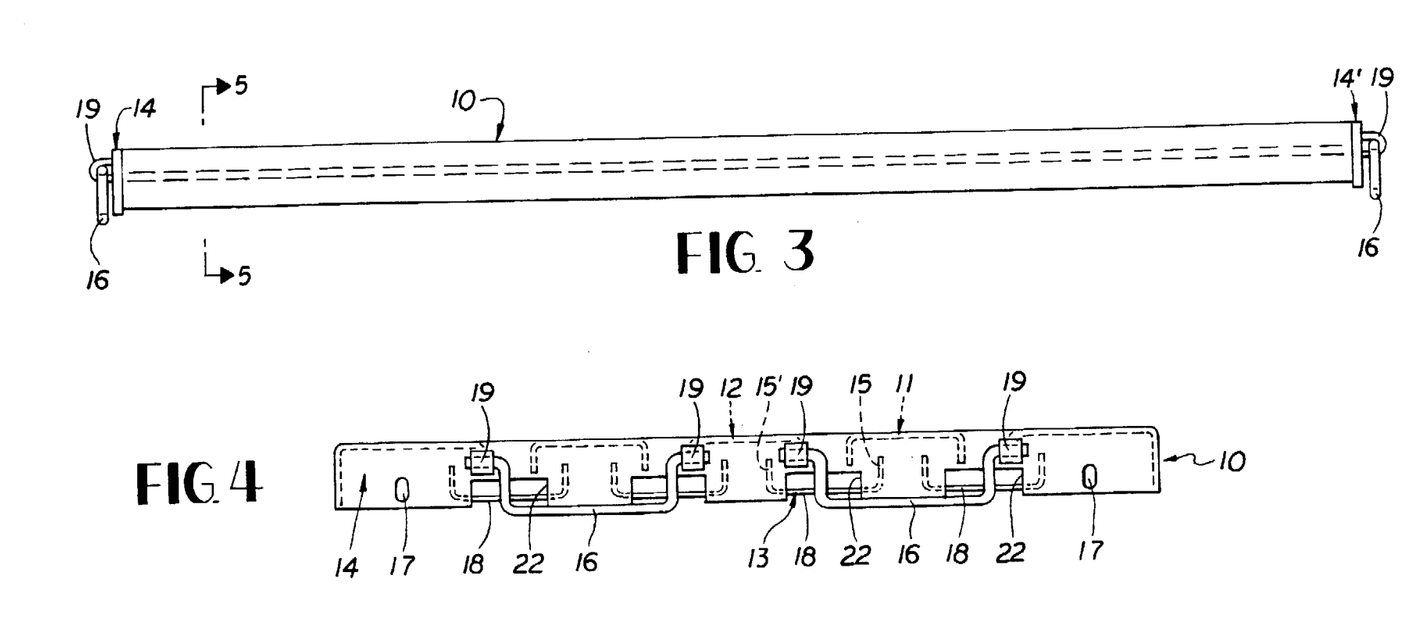
FIG. 3 is a side elevational view of the lid.
FIG. 4 is an end view of the lid.
Figure 5:
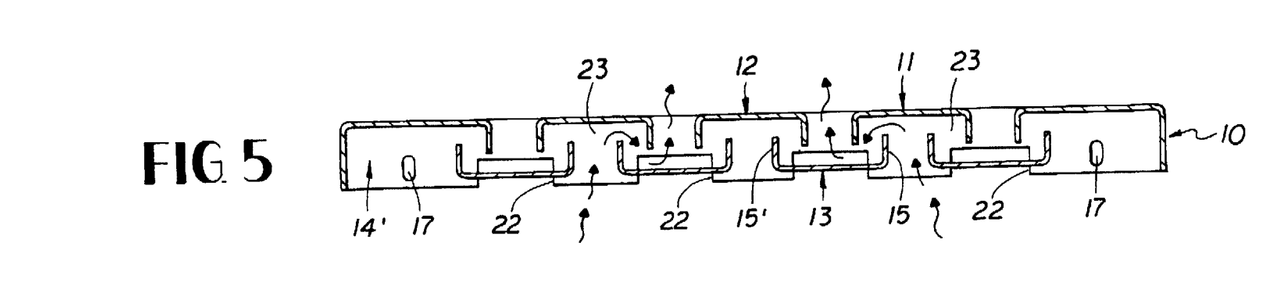
FIG. 5 is a sectional view of the lid taken along line 5—5 of FIG. 3.
Figure 5A:
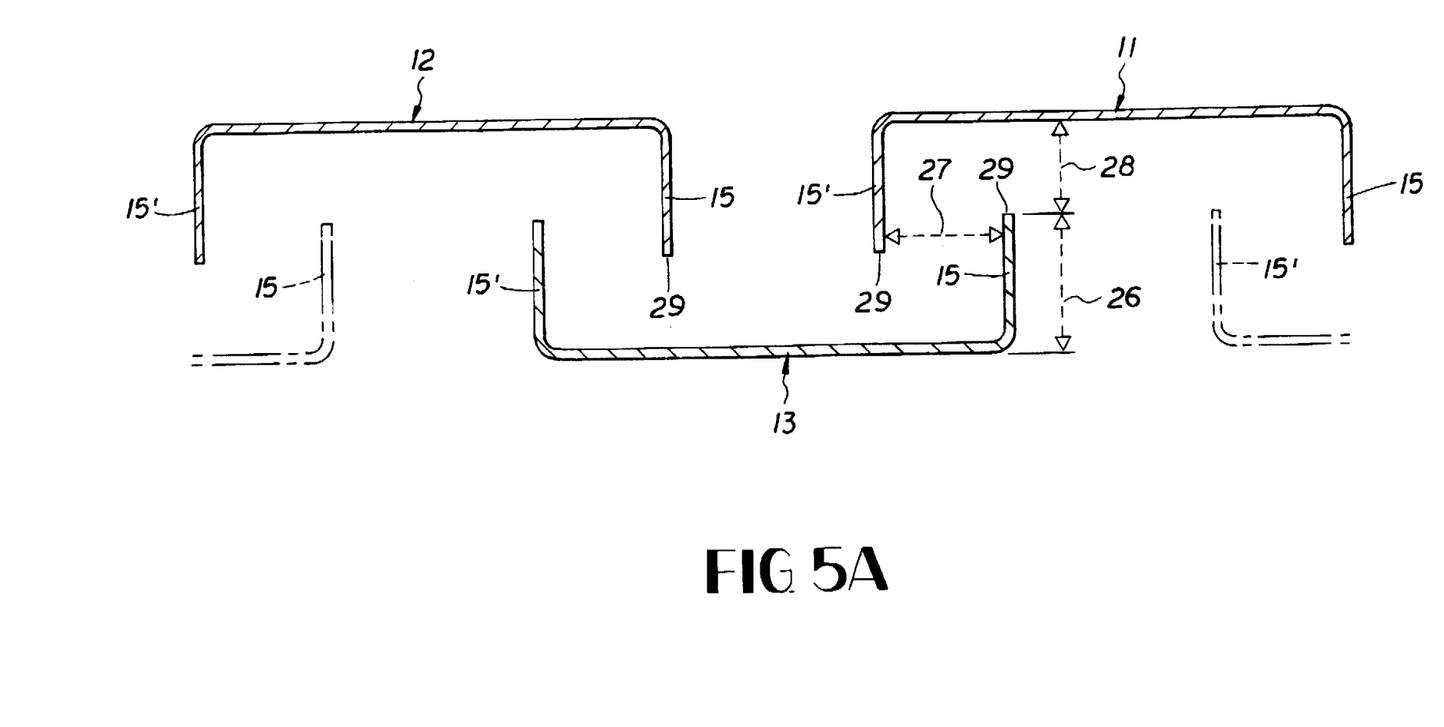
FIG. 5A is an enlarged view of the air channel in FIG. 5.

FIG. 4 provides an end view of lid 10 including handles 16, and drainage openings 22 in the end member 14. FIG. 5 shows a cross sectional view taken along lines 5—5 from FIG. 3. Due to the spacing arrangement between the elongated members, a labyrinthine, tortuous air channel 23 is formed between the lateral downwardly extending portions 15, 15' of representative members 11 and 12, and the lateral upwardly extending portions 15, 15' of representative member 13. As shown in FIG. 5A, to maintain a sufficiently tortuous path in each air channel the distance 28 of the edge 29 of lateral portion 15, 15' to the opposing member 11, and the distance 27 to the opposing lateral portion must be within 75 percent of the transverse dimension 26 of the lateral portion 15. A sufficiently tortuous path allows upwardly moving air within the enclosure to move freely through the channel and out of the enclosure, however, due to the severity of the labyrinthine air channel, flames are hampered from passing through the channel in the event of an internal fire within the enclosure.

Figure 7:
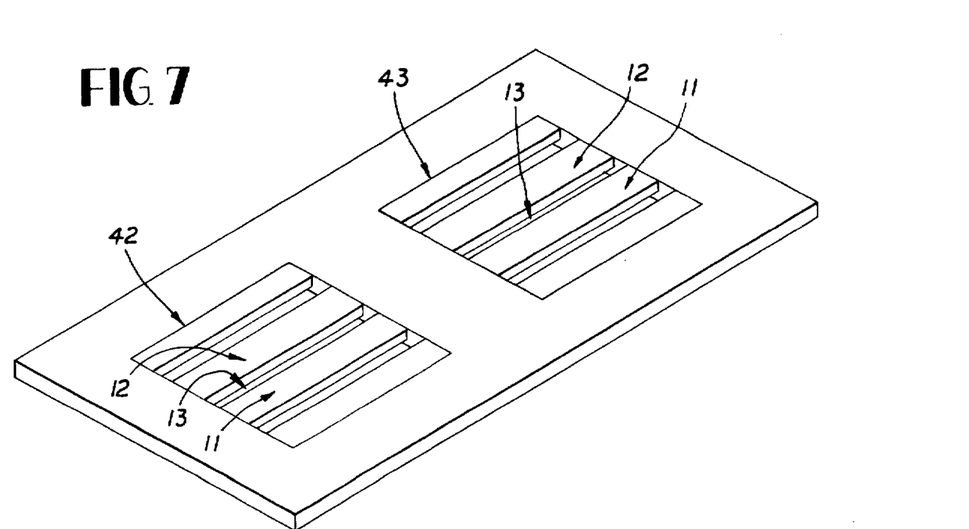
FIG. 7 is a perspective view of the lid in a second embodiment showing a flat panel surrounding and connecting two separate sets of elongated members.
Figure 8:
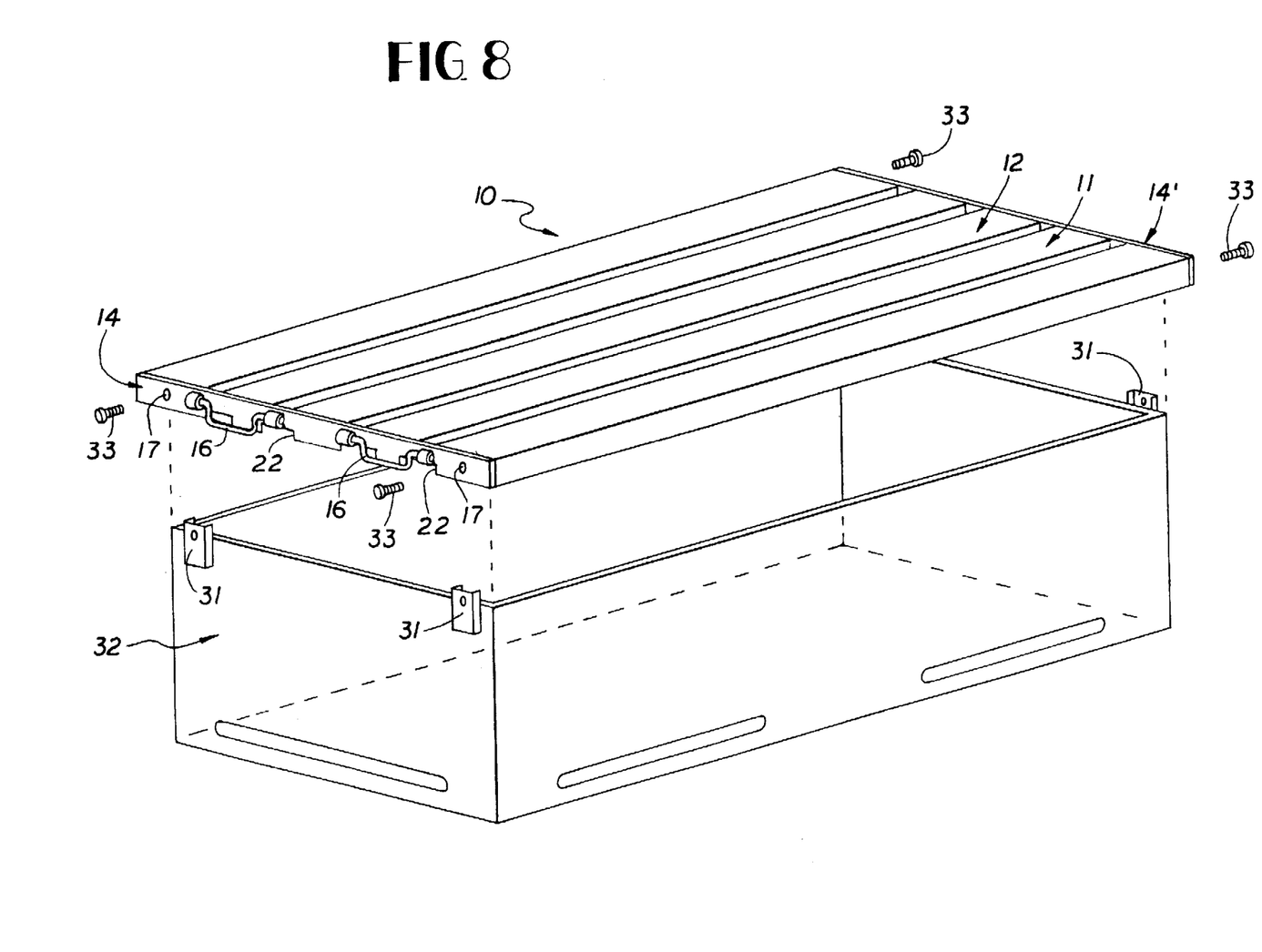
FIG. 8 is an environmental view of the lid attached to an electrical enclosure.
Figure 8A:
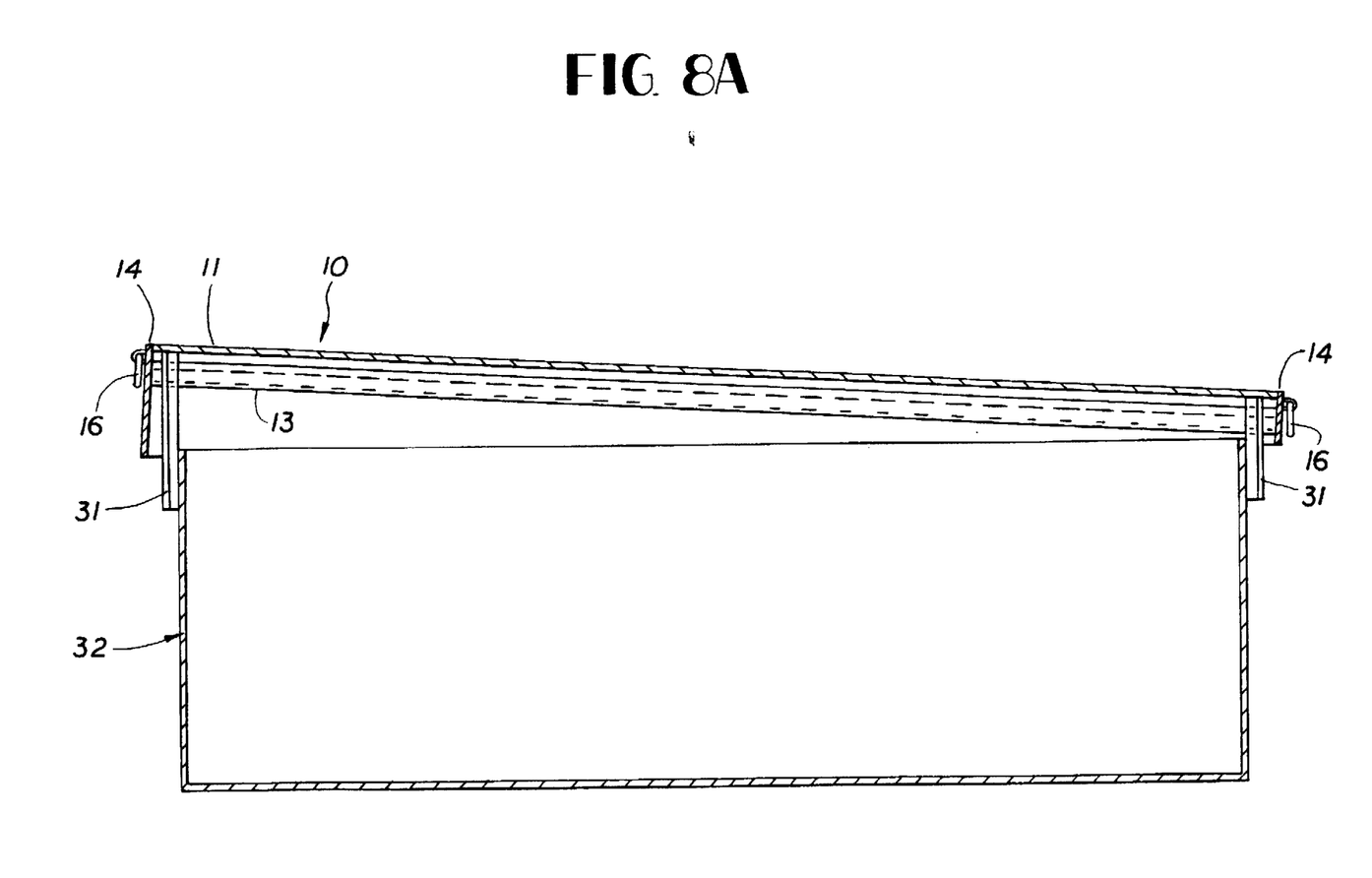
FIG. 8a is a sectional view of the lid attached to an electrical enclosure illustrating how the lid may be positioned with one end lower than the other to facilitate water drainage.

FIG. 7 shows a second embodiment of the invention. Representative elongated members 11, 12, and 13 are contained in two venting sections 42 and 43 surrounded by a rectangular panel 41. The nesting structure is the same as in FIGS. 1-5, however the surrounding panel takes the place of the end members 14, 14' for maintaining the spaced relationship of the elongated members to create the tortuous air channel FIG. 8 shows the invention attached to an electrical enclosure. Bolt 33 attaches the vented lid 10 onto connecting bracket 31 via attachment lid hole 17 in a conventional manner. Bracket 31 is welded onto enclosure frame 32 in such a manner that both lid ends 14, 14' extend away from the enclosure sidewalls. Because the ends extend over the enclosure perimeter, water draining from drainage holes 22 will drain outside of the perimeter of the enclosure and onto the ground. This avoids any problems from water running down the sides of the enclosure and possibly entering the enclosure. In operation, as electrical components inside the enclosure become heated, hot air rises to the top of the enclosure and passes out through the air channels and cooler air enters the enclosure from the bottom of the enclosure to replace the rising hot air, thereby facilitating convection cooling of the electrical enclosure and its internal electrical components. Additional environmental protection is provided by the array of elongated members which protects the enclosure from falling rocks and debris.

Having set forth the nature of the present invention, what is claimed is:

1. A vented lid for covering electrical equipment enclosures, comprising:
   a) a first elongated member having a longitudinal axis and having a lateral portion on each side of said axis extending orthogonally therefrom;
   b) a second elongated member having a longitudinal axis and having a lateral portion on each side of said axis extending orthogonally therefrom;
   c) said first member and said second member nested together in opposing relation so that one lateral portion of said first member is spaced from one lateral portion of said second member to form a tortuous air channel therebetween; and
   d) connecting means for connecting said first member to said second member in spaced relation.

2. A vented lid as recited in claim 1, further including drainage means for draining water from said channel.

3. A vented lid as recited in claim 2, wherein said lid comprises a plurality of said first and said second elongated members to form a rectangular planar array.

4. A vented lid as recited in claim 1, each lateral portion having a transverse dimension, wherein said spacing between said first member and said second member is less than 75 percent of said dimension such that said tortuous channel is sufficiently narrow that said lid is flame-resistant.

5. A vented lid suitable for use with electrical equipment enclosures, comprising:
   a) a first elongated member having a longitudinal axis and having a lateral portion on each side of said axis extending orthogonally therefrom;
   b) a second elongated member having a longitudinal axis and having a lateral portion on each side of said axis extending orthogonally therefrom;
   c) said first member and said second member nested together in opposing relation so that one lateral portion of said first member is spaced from one lateral portion of said second member to form a tortuous air channel therebetween;
   d) drainage means for draining water from said channel;
   e) a rectangular panel extending around said members for connecting said first member to said second member in spaced relation; and,
   f) wherein said lid comprises a plurality of said first and said second elongated members to form a rectangular planar array.

6. A vented lid suitable for use with electrical equipment enclosures, comprising:
   a) a first elongated member having a longitudinal axis and having a lateral portion on each side of said axis extending orthogonally therefrom;
   b) a second elongated member having a longitudinal axis and having a lateral portion on each side of said axis extending orthogonally therefrom;
   c) said first member and said second member nested together in opposing relation so that one lateral portion of said first member is spaced from one lateral portion of said second member to form a tortuous air channel therebetween;
   d) drainage means for draining water from said channel;
   e) at least one spacer member positioned between adjacent members at selected intervals for connecting said members; and,
   f) wherein said lid comprises a plurality of said first and said second elongated members to form a rectangular planar array.

7. A vented lid suitable for use with electrical equipment enclosures, comprising:
   a) a first elongated member having a longitudinal axis and having a lateral portion on each side of said axis extending orthogonally therefrom;
   b) a second elongated member having a longitudinal axis and having a lateral portion on each side of said axis extending orthogonally therefrom;
   c) said first member and said second member nested together in opposing relation so that one lateral portion of said first member is spaced from one lateral portion of said second member to form a tortuous air channel therebetween;
   d) drainage means for draining water from said channel;
   e) wherein each said member includes two ends and wherein an end member is connected to one end of each said members; and,
   f) wherein said lid comprises a plurality of said first and said second elongated members to form a rectangular planar array.

8. A vented lid as recited in claim 7, wherein said drainage means comprises a drainage opening in said end member.

9. A vented lid as recited in claim 8, wherein one end of each elongated member is lower than said other end.

10. A vented lid for covering electrical equipment enclosures, comprising:
    a) a first elongated member having a longitudinal axis of a selected length and having a lateral portion on each side of said axis extending orthogonally therefrom;
    b) a second elongated member having a longitudinal axis having a length equal to said selected length of said longitudinal axis of said first member and having a lateral portion on each side of said axis extending orthogonally therefrom;
    c) said first member and said second member nested together in opposing relation so that one lateral portion of said first member is spaced from one lateral portion of said second member to form a continuous tortuous air channel therebetween having a dimension along said longitudinal axis equal to said selected length;
    d) connecting means for connecting said first member to said second member in spaced relation, and
    e) wherein said lid comprises a plurality of said first and said second elongated members to form a rectangular planar array.

11. A vented lid as recited in claim 10, wherein said plurality of members are parallely aligned.

12. A vented lid as recited in claim 11, further including drainage means for draining water from said channel.

13. A vented lid as recited in claim 12, each lateral portion having a transverse dimension, wherein said spacing between said first member and said second member is less than 75 percent of said dimension such that said tortuous channel is sufficiently narrow that said lid is flame-resistant.

14. A vented lid suitable for use with electrical equipment enclosures, comprising:
    a) a first elongated member having a longitudinal axis and having a lateral portion on each side of said axis extending orthogonally therefrom;
    b) a second elongated member having a longitudinal axis and having a lateral portion on each side of said axis extending orthogonally therefrom;
    c) said first member and said second member nested together in opposing relation so that one lateral portion of said first member is spaced from one lateral portion of said second member to form a tortuous air channel therebetween, wherein each lateral portion has a transverse dimension and wherein said spacing between said first member and said second member is less than 75 percent of said dimension such that said tortuous channel is sufficiently narrow so that said lid is flame-proof;
    d) connecting means for connecting said first member to said second member in spaced relation, wherein said connecting means comprises an end member connected to one end of each said member;
    e) drainage means for draining water from said channel; and,
    f) wherein said lid comprises a plurality of said first and said second elongated members to form a rectangular planar array, said plurality in parallel alignment.

15. A vented lid as recited in claim 14, wherein said drainage means comprises a drainage opening in said end member.

16. A vented lid as recited in claim 15, wherein one end of each elongated member is lower than said other end.

17. A vented lid as recited in claim 15, wherein said lid includes handle means for lifting said lid.

18. A vented lid suitable for use with electrical equipment enclosures, comprising:
   a) a first elongated member having a longitudinal axis and having a lateral portion on each side of said axis extending orthogonally therefrom;
   b) a second elongated member having a longitudinal axis and having a lateral portion on each side of said axis extending orthogonally therefrom;
   c) said first member and said second member nested together in opposing relation so that one lateral portion of said first member is spaced from one lateral portion of said second member to form a tortuous air channel therebetween, wherein each lateral portion has a transverse dimension and wherein said spacing between said first member and said second member is less than 75 percent of said dimension such that said tortuous channel is sufficiently narrow so that said lid is flame-proof;
   d) connecting means for connecting said first member to said second member in spaced relation said connecting means comprising at least one spacer member positioned between adjacent members at selected intervals for connecting said members;
   e) drainage means for draining water from said channel; and,
   f) wherein said lid comprises a plurality of said first and said second elongated members to form a rectangular planar array, said plurality in parallel alignment.

19. A vented lid for covering electrical equipment enclosures, comprising:
   a) a first elongated member having a longitudinal axis of a selected length substantially equal to a horizontal dimension of an associated electrical enclosure and having a lateral portion on each side of said axis extending orthogonally therefrom;
   b) a second elongated member having a longitudinal axis having a length equal to said selected length of said longitudinal axis of said first member and having a lateral portion on each side of said axis extending orthogonally therefrom;
   c) a third elongated member having a longitudinal axis having a length equal to said selected length of said longitudinal axis of said first member and having a lateral portion on each side of said axis extending orthogonally therefrom;
   d) said first member, said second member, and said third member nested together in alternating opposing relation so that one lateral portion of said first member is spaced from one lateral portion of said second member to form a continuous first tortuous air channel therebetween having a dimension along said longitudinal axis equal to said selected length, and said other lateral portion of said second member is spaced from one lateral portion of said third member to form a continuous second tortuous air channel therebetween having a dimension along said longitudinal axis equal to said selected length; and
   e) connecting means for connecting said first member, said second member, and said third member in spaced relation.

20. A vented lid as recited in claim 19, each said lateral portion having a transverse dimension, wherein said spacing between said first member and said second member, and between said second member and said third member is less than 75 percent of said dimension, such that said tortuous channel is sufficiently narrow that said lid is flame-resistant.

21. A vented lid as recited in claim 20, wherein said lid includes handle means for lifting said lid.

22. A vented lid as recited in claim 19, wherein said lid comprises a plurality of said first, second, and third elongated members to form a rectangular planar array.

23. A vented lid suitable for use with electrical equipment enclosures, comprising:
   a) a first elongated member having a longitudinal axis and having a lateral portion on each side of said axis extending orthogonally therefrom;
   b) a second elongated member having a longitudinal axis and having a lateral portion on each side of said axis extending orthogonally therefrom;
   c) a third elongated member having a longitudinal axis and having a lateral portion on each side of said axis extending orthogonally therefrom;
   d) said first member, said second member, and said third member nested together in alternating opposing relation so that one lateral portion of said first member is spaced from one lateral portion of said second member to form a first tortuous air channel therebetween, and said other lateral portion of said second member is spaced from one lateral portion of said third member to form a second tortuous air channel therebetween; and
   e) connecting means for connecting said first member, said second member, and said third member in spaced relation wherein said connecting means comprises an end member connected to one end of each said member.

24. A vented lid as recited in claim 23, wherein said drainage means comprises a drainage opening in said end member.

25. A vented lid as recited in claim 24, wherein one end of each elongated member is lower than said other end.

26. A vented lid suitable for use with electrical equipment enclosures, comprising:
   a) a first elongated member having a longitudinal axis and having a lateral portion on each side of said axis extending orthogonally therefrom;
   b) a second elongated member having a longitudinal axis and having a lateral portion on each side of said axis extending orthogonally therefrom;
   c) a third elongated member having a longitudinal axis and having a lateral portion on each side of said axis extending orthogonally therefrom;
   d) said first member, said second member, and said third member nested together in alternating opposing relation so that one lateral portion of said first member is spaced from one lateral portion of said second member to form a first tortuous air channel therebetween, and said other lateral portion of said second member is spaced from one lateral portion of said third member to form a second tortuous air channel therebetween;
   e) connecting means for connecting said first member, said second member, and said third member in spaced relation, wherein said connecting means comprises at least one spacer member positioned between adjacent members at selected intervals for connecting said members; and
   f) wherein said lid comprises a plurality of said first, second, and third elongated members to form a rectangular planar array.

27. A vented lid suitable for use with electrical equipment enclosures, comprising:
   a) a first elongated member having a longitudinal axis and having a lateral portion on each side of said axis extending orthogonally therefrom;

b) a second elongated member having a longitudinal axis and having a lateral portion on each side of said axis extending orthogonally therefrom;

c) a third elongated member having a longitudinal axis and having a lateral portion on each side of said axis extending orthogonally therefrom;

d) said first member, said second member, and said third member nested together in alternating opposing relation so that one lateral portion of said first member is spaced from one lateral portion of said second member to form a first tortuous air channel therebetween, and said other lateral portion of said second member is spaced from one lateral portion of said third member to form a second tortuous air channel therebetween;

e) connecting means for connecting said first member, said second member, and said third member in spaced relation, wherein said connecting means comprises a rectangular panel extending around said members; and f) wherein said lid comprises a plurality of said first, second, and third elongated members to form a rectangular planar array.

* * * * *